United States Patent [19]

Weiler

[11] 4,258,570

[45] Mar. 31, 1981

[54] HIGH VOLTAGE POWER TRANSFORMER WINDING TEMPERATURE CONTROL SYSTEM

[76] Inventor: Fritz Weiler, 17 Kendleton Dr., Rexdale, Ontario, Canada

[21] Appl. No.: 3,367

[22] Filed: Jan. 15, 1979

[51] Int. Cl.³ .............................................. G01K 1/08
[52] U.S. Cl. ..................................... 73/350; 338/195
[58] Field of Search .......................... 338/195; 73/350

[56] References Cited

U.S. PATENT DOCUMENTS

| | | | |
|---|---|---|---|
| 1,917,163 | 7/1933 | Stephens et al. | 73/350 |
| 2,403,372 | 7/1946 | Jackson, Jr. | 73/350 |
| 2,405,449 | 8/1946 | Robinson et al. | 338/195 |
| 3,144,770 | 8/1964 | Sheely | 73/350 |
| 3,148,349 | 9/1964 | Rose et al. | 73/350 |
| 3,414,864 | 12/1968 | Barrington | 338/195 |
| 3,509,511 | 4/1970 | Soroka | 338/195 |

FOREIGN PATENT DOCUMENTS 1132087  3/1957  France ...................................... 73/350

*Primary Examiner*—Donald O. Woodiel

[57] ABSTRACT

A winding temperature heater well for detecting the temperature of the oil about the coils in large transformers. The heater well comprising a temperature detecting device enveloped by a grid-patterned resistor element, the current through which varies directly with the current through the transformer, and a sleeve which protects the resistor and temperature detecting device from the oil. The heater well is embedded in a resin plate in such a manner as to allow calibration of the resistor from outside the plate.

16 Claims, 5 Drawing Figures

HIGH VOLTAGE POWER TRANSFORMER WINDING TEMPERATURE CONTROL SYSTEM

BACKGROUND OF THE INVENTION

This invention relates to a device to simulate and indicate winding temperature in oil filled power transformers.

Large power transformers in use today work with a very high degree of efficiency. There is an energy loss in the transforming operation, however, and this loss manifests itself in the form of heat. The heat must be removed from the coils and core assembly to prevent premature aging of the insulation and subsequent failure or destruction of the transformer. The degradation of the insulation is a function of time and temperature. The most common coolants are oils which have good insulation properties, a low viscosity, a high relative thermal capacity and a good co-efficient of expansion for good circulation. Care must be taken to ensure both that there is proper oil circulation and that the oil does not overheat. Uncontrolled high oil temperatures may reduce transformer life or result in the insulation failure.

It is therefore necessary to keep a constant review of the oil temperature. Liquid temperature wells are used to measure the oil temperature along the outer wall of the transformer. They are not, however, suitable to measure the oil temperature around the transformer coils, which will be higher during use. The temperature of the core or winding can rise dangerously before the oil temperature changes are noted by the liquid temperature well on the transformer wall.

Winding temperature heater wells and winding temperature indicators have therefore been introduced. These devices simulate the amount of energy passing through the transformer at any particular time. An electrical current, proportional to the load, is taken by means of a current transformer to heat and run through a resistor in the winding temperature heater well. The heat generated by the resistor is measured by a temperature sensing bulb on a temperature detecting device. The temperature of the winding temperature indicator is therefore increased above the surrounding oil temperature proportional to the load.

Once calibrated the winding temperature heater well can be used to measure the core and winding temperature, which when combined with the wall oil temperature measured by the liquid temperature well, can accurately forecast dangerous overheating of the transformer.

There are several types of winding temperature heater wells known. They tend to be complicated in structure and/or difficult to calibrate. The general construction is to provide a temperature detecting device, a resistor element through which the current is run and a metal sleeve thereover to protect the inside workings from the oil. The resistor element comprises either a winding coil or a solid tube surrounding the temperature detecting device. It is also common to place a second sleeve about the first sleeve and fill the intervening gap with an oil to act as an insulator for the device. In known systems, the resistor often must waste heat heating the oil used as an insulator in the well. This causes calibration problems as the insulating oil affects the amount of heat measured by the heat detecting device.

The purpose of the device is to reflect the hottest spot of the winding transformer coils, by measuring the heat put out by the resistor, the amount of heat being directly determined by the amount of electrical current through the resistor element. It is therefore important that the heat generated be accurately reproduced proportional to the transformer load.

The known devices are large and bulky and so require a long warm up time till they are heated up and start radiating this heat to the temperature detecting device. The large resistors in these devices require a large current to heat them up. Access to the known devices is also often retricted. The parts are usually delicate to handle and must therefore be assembled at the time of installation.

The known winding temperature well devices are also unduly affected by ambient temperatures as they radiate heat externally which may not be fully detectable by the temperature sensing bulb. Calibration of the resistor element is then not accurately possible as not all the heat energy being radiated is being measured.

The temperature wells are usually mounted in a plate structure in a wall of the transformer. Presently, there is not known any such structure which properly electrically and thermally insulates the winding and liquid temperature wells from the ambient temperature.

Another problem with presently known wall plate structures is that the wiring from the winding temperature well to the calibrating resistor is often externally located. This requires long conductors around the transformer housing exposed to ambient temperature changes. Damage to these exterior connections and possible calibrating errors are more likely in this situation than if the connections were made inside of the wall plate structure.

SUMMARY OF THE INVENTION

Accordingly, it is an object of the present invention to provide an improved resistor element and a winding temperature heater well using same which avoids the use of oil in the sleeve as an insulator, and which also provides a low ohmage resistor element whose heat output is more accurately measurable, and a thermal plate system incorporating the same which electrically and thermally insulates the heating well from atmospheric conditions and permits calibration of the resistor from outside the transformer after installation.

In one of its embodiments the invention provides a resistor plate for use in a winding temperature heating well, said plate having a section thereof which has formed therein a plurality of apertures so as to uniformly increase the resistance of the plate therealong.

In another of its embodiments the invention provides a winding temperature heater well for use in measuring oil temperature fluctuations in power transformers due to increased electrical current flow through the transformers comprising (a) a temperature detecting device with a temperature sensing bulb, (b) a resistor element adapted to envelope the temperature detecting bulb, but electrically insulated therefrom; and (c) an outer sleeve adapted to enclose the resistor element to prevent contact of the oil therewith, and thermally insulated therefrom, wherein the resistor element has a section thereof which has formed therein a plurality of apertures increasing the electrical resistance therealong, the electrical current flow through the resistor element varying directly with the electrical current flow through the transformer and being sufficient to cause heating only in the apertured section of the resistor element, without damaging same, when passing therethrough.

In a further embodiment, the invention also provides a winding temperature detecting system for use with power transformers to measure cooling oil temperature comprising (a) a temperature detecting device with a temperature sensing bulb connected to a temperature guage, (b) a resistor element, having a section thereof of highest resistivity with a plurality of apertures therein, where the apertured section surrounds the temperature sensing bulb and is electrically insulated therefrom, the current through the resistor element varying directly with the transformer current and constant throughout the apertured section, the current sufficient to heat only the apertured section, without damage when passing therethrough, and (c) an outer sleeve adapted to enclose the resistor element, to prevent contact with the cooling oil in the transformer, and thermally insulated therefrom, said resistor element and outer sleeve insulatingly attached at a common end which is embedded in a thermal plate in the transformer wall, which plate electrically and thermally insulates the resistor element and sleeve from the transformer wall.

In still another embodiment of the invention, there is provided a winding temperature thermal plate assembly for use with oil cooled power transformers to measure the cooling oil temperature comprising a liquid temperature detecting means and at least one winding temperature detecting means, each connected to respective temperature gauges, and each embedded at one end in a thermal plate which electrically and thermally insulates the two detecting means from the transformer walls, each winding temperature detecting means including (a) a temperature detecting device with a temperature sensing bulb which is connected to the temperature gauge associated with said winding temperature thermal plate assembly, (b) a resistor element having an apertured section of highest and uniform resistivity in thermal contact with but electrically insulated from the temperature sensing bulb, the resistor element having a current therethrough directly proportional to the transformer current and sufficient to cause heating only in the apertured section of the resistor element without damage thereto when passing therethrough, the resistor element being electrically connected with calibrating shunt resistor, accessible from the exterior of the transformer, with which the resistor element can be calibrated by an externally applied current, and (c) an outer sleeve thermally insulated by an air pocket from the resistor element and enclosing same to prevent contact of the oil therewith.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1A:
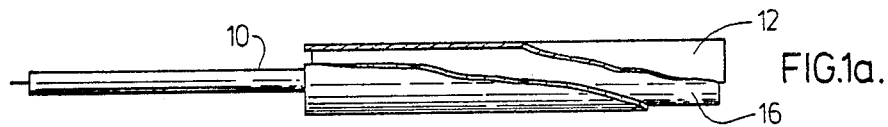
FIGS. 1(a), (b) and (c) are side views of the different components of the winding temperature heater well.

FIG. 1 shows the different units which when combined make up the winding temperature heater well in the applicant's preferred embodiment. FIG. 1(a) shows the type of temperature detecting device 10 used. The temperature sensing bulb 16 is coated with a thin layer of an electrical insulator 12 to prevent electrical contact between the resistor element 14 and the temperature sensing bulb 16. One type of suitable insulator would be an adhesive-coated mylar tape. Other types will be obvious to those skilled in the art. For best results, the tape should slightly overhang the ends of the temperature sensing bulb 16. The insulator 12 should be as thin as possible so that the heat released by the heating portion 20 of the resistor element 14 can be absorbed as much as possible by the temperature sensing bulb 16. This allows a more accurate reading by the temperature detecting device 10 when it is fitted inside the resistor element 14.

Figure 1B:
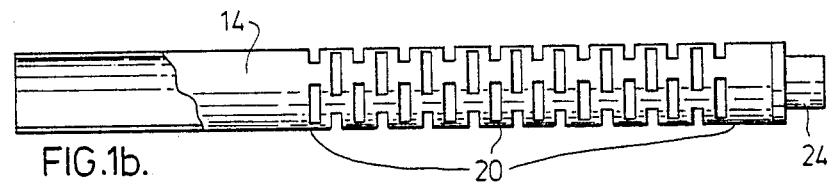
Figure 2:
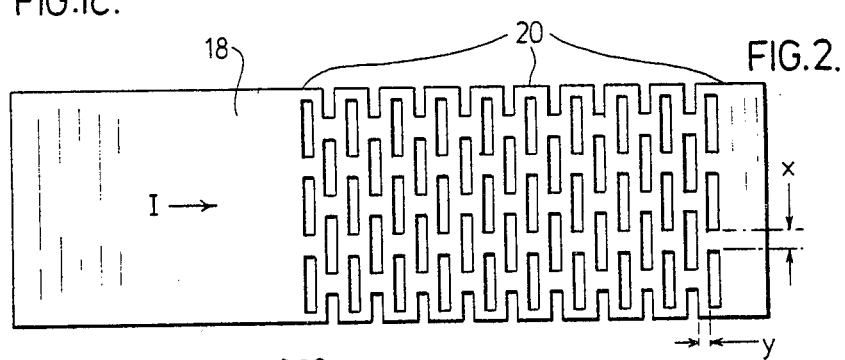
FIG. 2 is a view of a suitable resistor plate for use as the resistor element.

The applicant's preferred resistor element 14 is the resistor element shown in FIG. 1(b). It is formed so as to be snugly slidable over the temperature sensing bulb 16 and insulation tape 12. The resistor element can be formed from a plate 18 as is shown in FIG. 2. This plate 18 should be made from a low resistivity material such as a nickel alloy. Towards one end of the plate 18 is an apertured section 20. This section is apertured so that the resistivity of the resistor element 14 is increased in this section. As a result, the greatest amount of heat given off will be by the apertured section 20 of the resistor element 14. Accordingly, very little heat will be wasted in that case by radiating to other than the temperature sensing bulb 16.

To ensure the most accurate measurement of the heat generated by the resistor element 14, and hence the current through the resistor, which is proportional to the load of the transformer, it is best that the resistance throughout the apertured section be as constant as possible. The aperture distribution in the structure shown in FIG. 2 creates this increased resistivity and at the same time provides a constant resistivity throughout the apertured section 20. The apertures in the preferred embodiment shown in FIG. 2 are so arranged so that the dimension x, dimension between horizontally adjacent apertures, when the current direction I is considered the vertical direction, is twice the dimension of y, the distance between vertically adjacent apertures. Adjacent vertical rows of apertures are also exactly 180° out of phase so that the center of any aperture is aligned with the center of the horizontal space between vertically adjacent apertures. This provides an even distribution of constant resistivity.

By ensuring that the apertured section 20 has the same length as the temperture sensing bulb 16 of the temperature detecting device 10 and that the two sections completely overlap, then the best possible detection of the total heat output is possible. The exact overlap also ensures that heat energy is not wasted on a portion of the heat detecting device 10 other than the temperature sensing bulb 16. Accordingly, a low current can be used in the resistor element 14. Assurance of consistent and reproducible characteristics of the heater plate 18 is provided by the fixed die pattern of the apertures. This allows for the mass production of a uniform calibrated resistor unit which has a very simple but very strong structure. The exact overlap also shortens the amount of time required to heat up the resistor element. As a result, there is a more immediate reflection in the heat of the resistor element 14 of any changes in the transformer core and winding temperature.

Figure 1C:
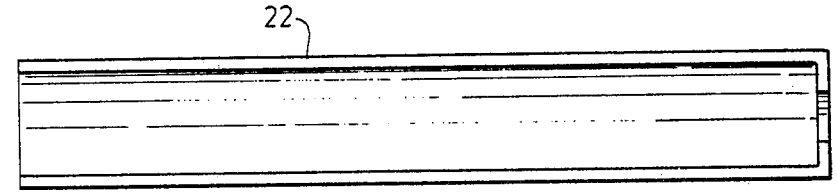
Figure 3:
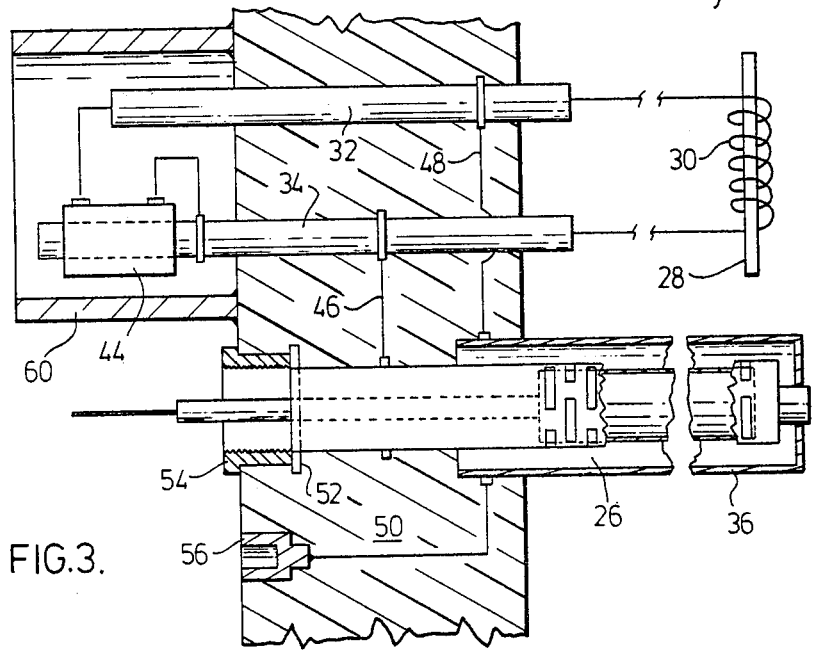
FIG. 3 is a cross-sectional view of the thermal plate in a preferred embodiment showing a single winding temperature heater well assembly.

Sleeve 22 is shown in FIG. 1(c). It fits over the end of the resistor element 14 to protect the interior portions from the transformer oil. It is in direct electrical contact with the resistor element 14 through the end piece 24. However, it is thermally insulated from the resistor element 14 to ensure that the heat generated by the resistor element 14 is spent mostly on the temperature sensing bulb 16. The insulation preferred by the applicant comprises an air gap 26 between the sleeve 22 and the resistor element 14 (FIG. 3). This provides for consistent heater well characteristics.

Figure 4:
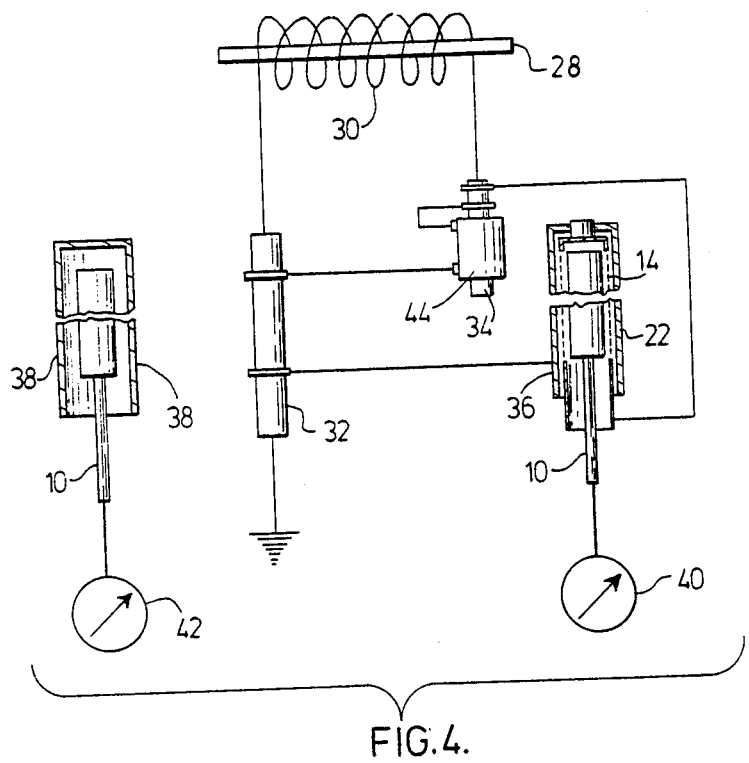
FIG. 4 is a schematic wiring of the complete temperature detecting system.

FIG. 4 is a schematic diagram of the applicant's system using the novel winding temperature heater well defined above. The primary transformer lead is designated by reference numeral 28. The secondary lead 30 wound thereabout is connected to a grounding stud 32 at one end and a resistor stud 34 at the other. The resistor element 14 is connected to the resistor stud 34, the current flowing from the resistor stud 34 through the resistor element 14, to the sleeve 22 which is grounded through the grounding stud 32.

The temperature detecting devices 10 in each the winding temperature heater well 36 and the liquid temperature well 38 are connected to temperature gauges 40 and 42.

While the applicant's system does provide a more certain calibration of the resistor element 14 than do other known systems, it still requires some calibration, although it provides an easier system to calibrate. A calibrating shunt resistor 44 mounted on stud 34 is used to calibrate the resistor element 14. The calibrating shunt resistor 44 is selected at the time of calibration on the transformer to shunt a portion of the current from the heater well 36, if necessary. Therefore, current flows from the stud 34 through the heater well resistor element 14 and also partly through the calibrating shunt resistor 44 to the ground stud 32.

FIG. 3 shows a preferred embodiment of the invention, a thermal plate with a single winding temperature well. Any multiple of wells may be used and embedded in a suitable cast thermosetting resin plate of the desired configuration. The winding temperature heater well 36, the ground stud 32 and the resistor stud 34 are embedded and electrically connected in the thermally and electrically insulating thermal plate 50. This allows a simple installation of a plate structure where only the current transformer connections are to be provided. As the studs 32 and 34 in FIG. 4 are accessible from both sides of the thermal plate, the current source connection can be arranged internally or externally.

FIG. 3 shows the electrical wiring. The current flows from the resistor stud 34, through wire 46, through resistor element 14, through end piece 24, through sleeve 22, through wire 48 and then to ground stud 32 which completes the circuit. All these components are embedded in the thermal plate 50.

The thermal plate 50 may be constructed of any suitable thermal and electrical insulating material. The applicant's preference is for a thermosetting resin material which can be cast molded about the preconnected wiring assembly, which becomes embedded therein along those portions indicated in FIG. 3.

To ensure insulation of the resistor element 14 and the sleeve 22, there is provided an asbestos insulator break 52 about the connector 54 through which the temperature detecting device 10 is inserted, and to which it is connected, from outside the plate 50 into the resistor element 14. The insulator break 52 separates the resistor element 14 from the threaded connector 54 into which the temperature gauge 40 (FIG. 4) is securely attached.

Figure 5:
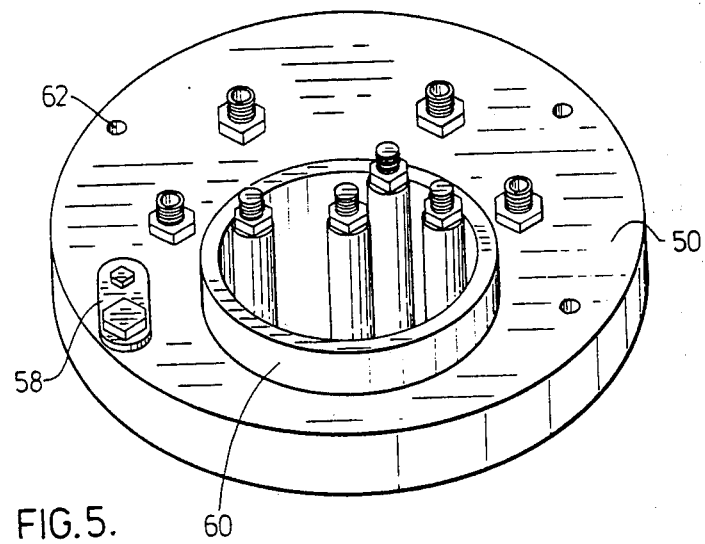
FIG. 5 is a front view of the thermal plate in a preferred embodiment.

FIG. 5 is a front view of the thermal plate 50 preferred by the applicant with 3 or 4 mounting holes 62. It shows connectors 54 for three different winding temperature heater wells 36 and one liquid temperature well 38. One winding temperature heater well 36 would be required for each transformer coil in the transformer. Three such coils in a transformer is a very common construction. Of course, only a single liquid temperature heating well is needed whatever the number of transformer coils. Only one resistor stud 34 is required whatever the number of winding temperature heater wells 36. These four studs are contained in a protective resistor housing 60 over which a cap (not shown) can be positioned for weather proof application. Liquid and winding temperature indicator gauges are to be attached through connectors 54 with their respective temperature detecting devices 10 to indicate the respective temperatures and initiate further control circuits.

The thermal plate 50 and its circuitry has to be considered as a non-grounded device. However, a ground connector 56, also embedded in the thermal plate 50 is used to ground the several circuits at one point by means of a metal link 58 and one mounting bolt (not shown) for discharge of electrostatic accumulation only. The test link 58 may be opened temporarily for insulation integrity, for calibration, for field testing or for external current injection as required.

Although the description of the invention has been given with respect to particular embodiments, it is not to be construed in a limiting sense. Many variations and modifications will now occur to those skilled in the art. For a definition of the invention reference is made to the appended claims.

I claim:

1. An electrically conducting plate, which can e cylindrically formed and which in such cylindrical form can be used as a resistor in a winding temperature heater well, comprising a section thereof which has formed therein a plurality of apertures increasing the electrical resistance of the plate uniformly therealong, wherein the apertures in the apertured section are sized and shaped as equivalent rectangles aligned in vertical and horizontal rows, vertical being the direction of current flow through the plate, each horizontal row displaced 180° with respect to vertically adjacent rows, defining horizontal and vertical paths about the apertures such that the vertical paths are twice the width of the horizontal paths.

2. A winding temperature heater well for use in measuring oil temperature fluctuations in power transformers due to increased electrical current flow through the transformers comprising:
   (a) a temperature detecting device with a temperature sensing bulb,
   (b) a resistor element having a section thereof of highest resistivity with a plurality of apertures therein, wherein the apertured section is adapted to envelop the temperature sensing bulb but electrically insulated therefrom,
   (c) an outer sleeve adapted to enclose the resistor element, to prevent contact of the oil therewith, and thermally insulated by an air pocket therefrom but electrically connected therewith, and (d) means for supplying to the resistor element an electrical current directly proportional to the power transformer current sufficiently low as to not damage the resistor element but sufficiently high as to heat the apertured section of the resistor element.

3. The heater well as claimed in claim 2 wherein the temperature sensing bulb and the resistor element are cylinderically shaped and electrically insulated from each other by a thin layer of material which is a poor thermal insulator but a good electrical insulator.

4. The heating well as claimed in claim 3 where the material is mylar tape.

5. The heater well as claimed in claim 3 wherein the apertures in the apertured section are sized and shaped so that the resistance of the resistor element is a constant throughout the apertured section, which section is the same size as and is adjacent to the temperature sensing bulb.

6. The heater well as claimed in claim 5 wherein the apertures are equivalent rectangles aligned in vertical and horizontal rows, each horizontal row displaced 180° with respect to vertically adjacent rows, defining horizontal and vertical paths thereabout where the vertical paths are twice the width of the horizontal paths, vertical being the direction of current flow through the resistor element.

7. The heater well as claimed in claim 6 wherein the thermal insulation between the outer sleeve and the resistor element is provided by an air pocket.

8. A winding temperature thermal plate assembly for use with oil cooled power transformers to measure the cooling oil temperature comprising a liquid temperature well and at least one winding temperature heater well, each connected to respective temperature gauges, and each embedded at one end in a thermal plate which electrically and thermally insulates the two wells from the transformer walls, each winding temperature heater well including:

(a) a temperature detecting device with a temperature sensing bulb which is connected to the temperature gauge associated with said winding temperature heater well, (b) a resistor element having an apertured section of highest and uniform resistivity in thermal contact with, but electrically insulated from, the temperature sensing portion, the resistor element being electrically connected with a shunt calibrating resistor through a resistor stud which is embedded in and extends through the plate, with which the resistor element can be calibrated by an externally applied current;

(c) means for supplying to the resistor element an electrical current directly proportional to the power transformer current sufficiently low as to not damage the resistor element but sufficiently high as to heat the apertured section of the resistor element; and (d) an outer sleeve thermally insulated by an air pocket from the resistor element and enclosing same to prevent contact of the oil therewith, but electrically connected to the resistor element, the sleeve and resistor element embedded at one end in the plate, the assembly further including a grounding stud for grounding electrostatic charges, the grounding stud in electrical contact with the liquid temperature well, the shunt calibrating resistor and the outer sleeve, said grounding stud embedded in and extending through the plate, the electrical connections in the assembly being all embedded in the plate except for those to the shunt calibrating resistor, the temperature detecting device insertable into the resistor element through an opening in the plate.

9. A winding temperature thermal plate assembly for use with power transformers to measure oil and winding temperatures comprising:

(a) a plate which has both thermal and electrical low conductivity;

(b) a temperature detecting device, with a temperature sensing bulb connected to a temperature gauge, electrically insulated from the rest of the assembly;

(c) a resistor element having a section thereof of highest resistivity with a plurality of apertures therein, wherein the apertured section surrounds the temperature sensing bulb and is electrically insulated therefrom;

(d) an outer sleeve adapted to enclose the resistor element to prevent contact with and thermally insulate by a pocket of air the resistor element from the oil in the transformer;

(e) means for supplying to the resistor element an electrical current directly proportional to the power transformer current sufficiently low as to not damage the resistor element but sufficiently high as to heat the apertures section of the resistor element;

(f) a resistor stud;

(g) a grounding stud; and (h) a ground connection;

wherein (i) the resistor element and outer sleeve are completely embedded at a first end in the thermal plate and are electrically connected at the second and other end, (j) the resistor element is electrically connected near the first end to near a first end of the resistor stud, (k) the outer sleeve is electrically connected to the grounding stud near the first end, (l) the resistor stud is electrically connected at the first end to the electrical current supply means and near the other end to the grounding stud;

(m) the ground connection electrically intermittantly connectable to the ground stud for grounding for electrical discharges only;

(n) all of the electrical connections, except that from the resistor stud to the electrical current supply means and from the resistor stud to the grounding stud are embedded in the plate; and (o) the resistor stud and grounding stud extend in both directions through the plate.

10. The thermal plate assembly as claimed in claim 9 further comprising a shunt calibrating resistor electrically connected in series between the resistor stud and grounding stud.

11. The thermal plate assembly as claimed in claim 10 further comprising additionally at least one of each of the temperature detecting device, temperature gauge, resistor element, outer sleeve, means for supply electrical current to the resistor element, resistor stud and shunt calibrating resistor, there being equal numbers of each in the plate assembly, wherein all the shunt calibrating resistors are electrically connected to the single grounding stud.

12. The thermal plate assembly as claimed in claim 11 further comprising at least one liquid temperature well embedded, at one end, in the plate.

13. The thermal plate assembly as claimed in claim 12 wherein in the apertured section of the resistor element the apertures are sized and shaped as equivalent rectangles aligned in vertical and horizontal rows, vertical being the direction of current flow through the plate, each horizontal row displaced 180° with respect to vertically adjacent rows, defining horizontal and vertical paths about the apertures such that the vertical paths are twice the width of the horizontal paths.

14. The thermal plate assembly as claimed in claim 13 wherein the plate is made from a thermosetting resin material which can be cast molded about the electrical connections.

15. The thermal plate assembly as claimed in claim 14 wherein an opening is provided through the plate to inside the resistor element and each of the liquid temperature wells to permit removable insertion of the temperature detecting devices after construction of the plate assembly.

16. The thermal plate assembly as claimed in claim 15 wherein there is provided a detachable housing to enclose the exposed outer portions of the resistor and ground studs.

* * * * *